US011349771B2

(12) United States Patent
Lesartre et al.

(10) Patent No.: US 11,349,771 B2
(45) Date of Patent: May 31, 2022

(54) METHOD AND SYSTEM FOR ENHANCED QUEUE MANAGEMENT IN A SWITCH

(71) Applicant: Hewlett Packard Enterprise Development LP, Houston, TX (US)

(72) Inventors: Gregg B. Lesartre, Ft. Collins, CO (US); Jason Jung, Garland, CO (US); Norell Estella Menhusen, Ft. Collins, CO (US); Christopher Michael Brueggen, Allen, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 25 days.

(21) Appl. No.: 16/863,904

(22) Filed: Apr. 30, 2020

(65) Prior Publication Data

US 2021/0344610 A1    Nov. 4, 2021

(51) Int. Cl.
*H04L 12/863*    (2013.01)
*H04L 12/823*    (2013.01)
*H04L 47/62*    (2022.01)
*H04L 47/32*    (2022.01)

(52) U.S. Cl.
CPC ............ *H04L 47/621* (2013.01); *H04L 47/32* (2013.01)

(58) Field of Classification Search
CPC .............................. H04L 47/621; H04L 47/32
See application file for complete search history.

(56) References Cited

U.S. PATENT DOCUMENTS

| 6,467,008 | B1* | 10/2002 | Gentry, Jr. | .......... | H04L 47/6225 |
| | | | | | 710/261 |
| 6,862,430 | B1* | 3/2005 | Duffy | ................... | H04B 7/2606 |
| | | | | | 370/252 |
| 7,334,014 | B2* | 2/2008 | Moser | ................. | G06F 11/1683 |
| | | | | | 709/202 |
| 2010/0054268 | A1* | 3/2010 | Divivier | ................ | H04L 47/624 |
| | | | | | 370/412 |
| 2016/0219088 | A1* | 7/2016 | Ma | .......................... | H04L 47/32 |
| 2021/0058334 | A1* | 2/2021 | Greth | ...................... | H04L 47/28 |

* cited by examiner

*Primary Examiner* — Kibrom T Hailu
*Assistant Examiner* — Nizam U Ahmed
(74) *Attorney, Agent, or Firm* — Park, Vaughan, Fleming & Dowler LLP

(57) ABSTRACT

One embodiment of the present invention provides a switch. During operation, the switch maintains a first counter to indicate a first number of packets in a queue of the switch. The switch then determines whether a clock of the switch has reached a threshold value. If the clock reaches the threshold value, the switch starts maintaining a second counter to indicate a second number of packets in the queue that have been received after the clock has reached the threshold value. The switch continues to decrement the first counter in response to a packet leaving the queue until the first counter reaches a value of zero. When the clock reaches a maximum value supported by the clock, the switch drops a third number of packets from the queue indicated by the first counter.

18 Claims, 9 Drawing Sheets

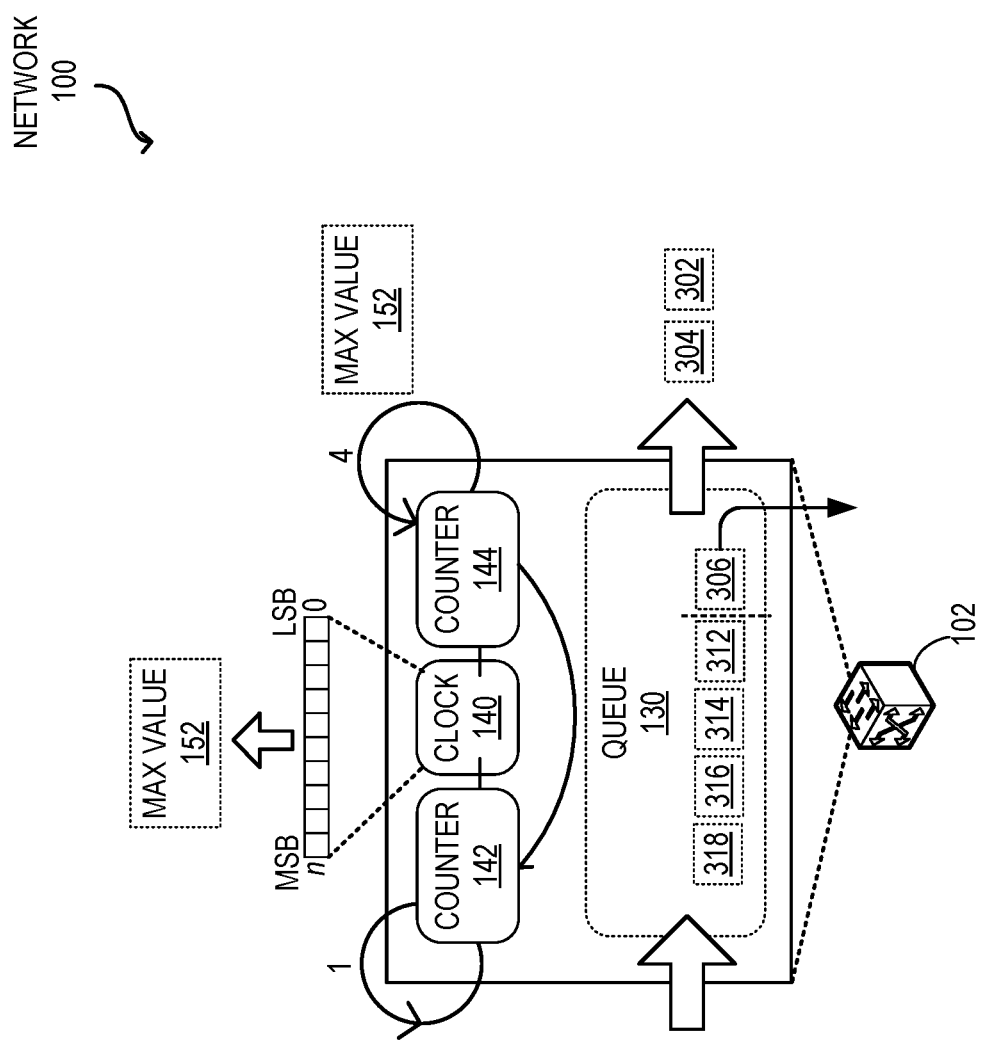

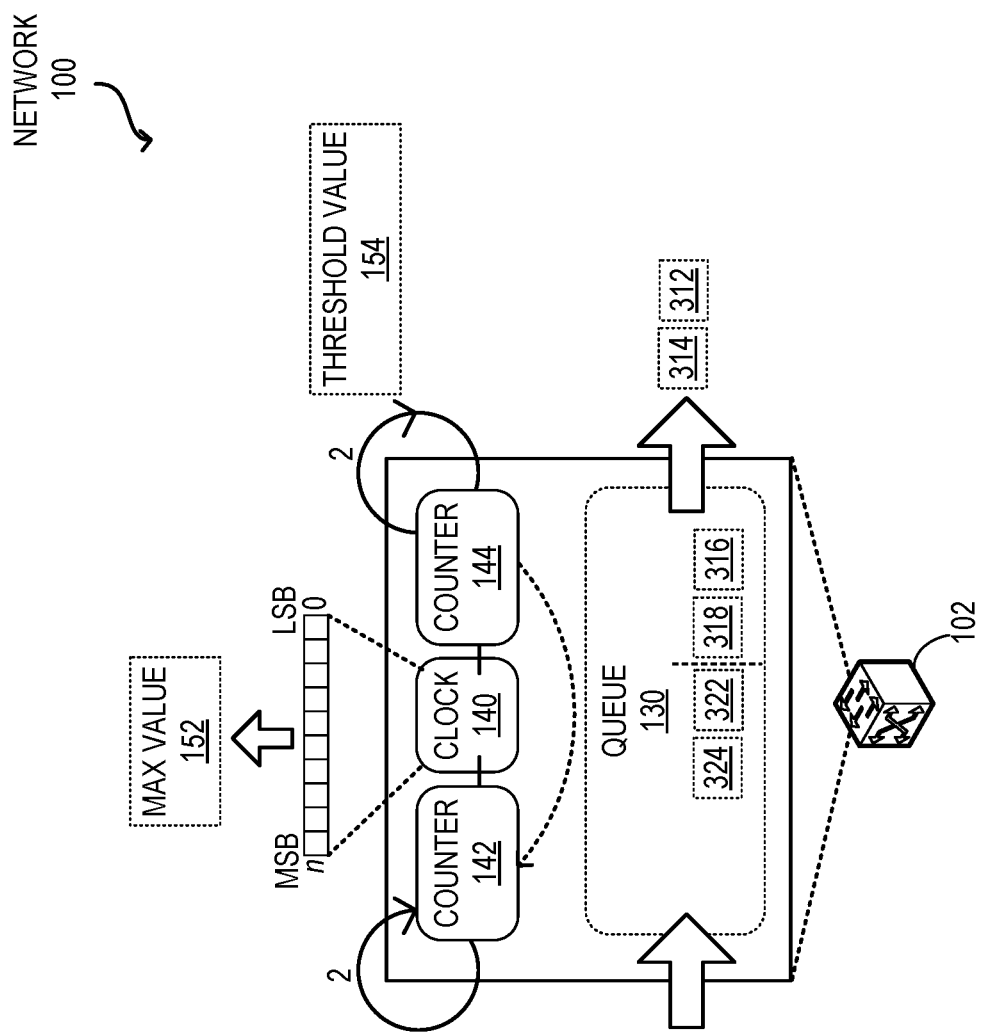

METHOD AND SYSTEM FOR ENHANCED QUEUE MANAGEMENT IN A SWITCH

BACKGROUND

Field

The present disclosure relates to communication networks. More specifically, the present disclosure relates to a method and system for efficiently managing aging packets in a queue to avoid duplication.

BRIEF DESCRIPTION OF THE FIGURES

FIG. 3B illustrates exemplary operations of enhanced queue management using a secondary counter, in accordance with an embodiment of the present application.

FIG. 3C illustrates exemplary operations of enhanced queue management using counter switchover, in accordance with an embodiment of the present application.

In the figures, like reference numerals refer to the same figure elements.

DETAILED DESCRIPTION

Figure 1:
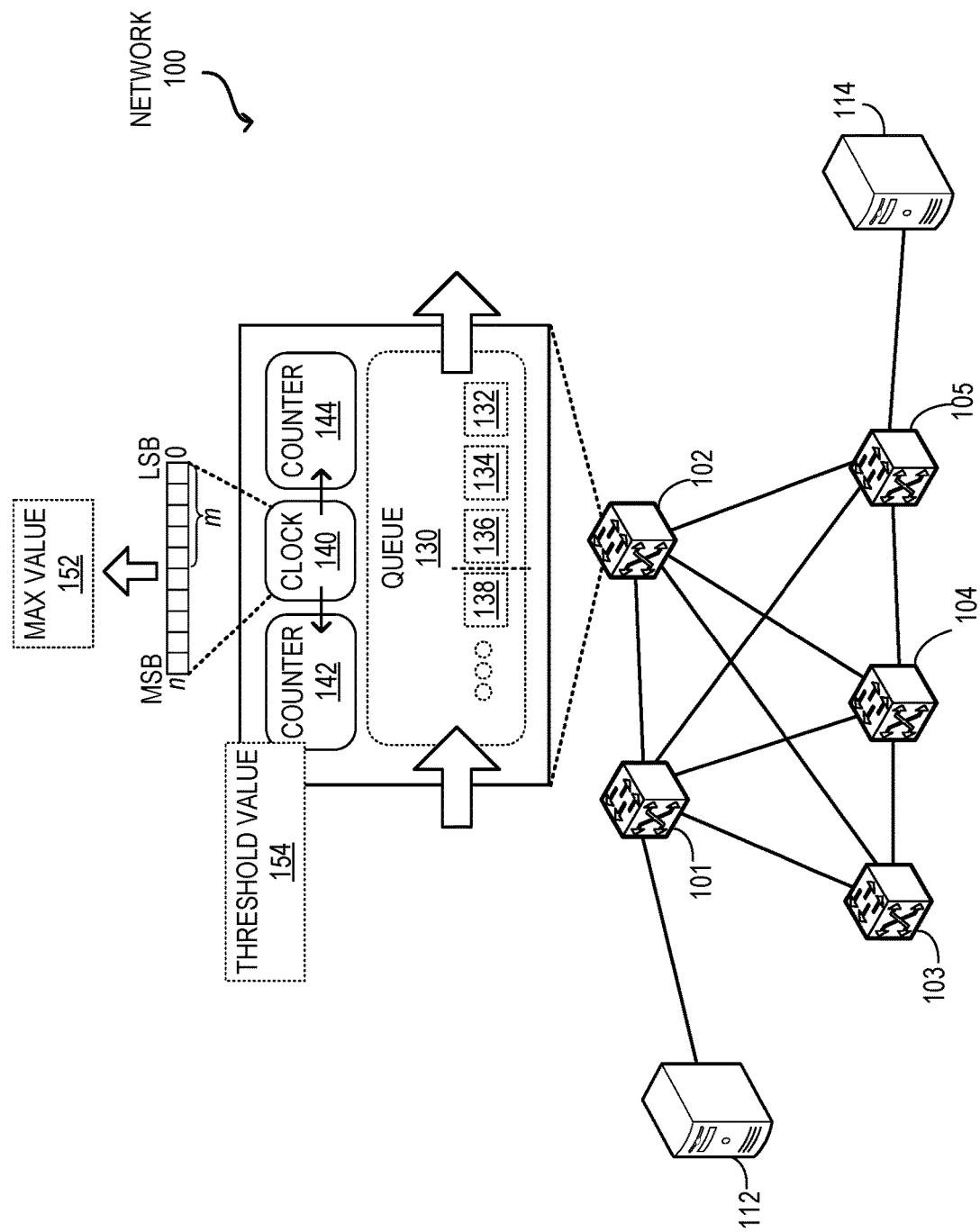
FIG. 1 illustrates an exemplary network with enhanced queue management support, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for bandwidth. As a result, equipment vendors race to build larger devices with significant processing capabilities. However, the processing capability of a device may not be sufficient to keep up with complex systems that run on such devices. For example, software systems may require a significant number of processing cycles and increasing amounts of memory bus bandwidth. Even with significant processing capability, these devices may not be able to provide the desired level of performance for the complex systems.

A flexible and efficient way to meet the requirements of the complex systems can be based on memory-semantic communications. Memory-semantic communication facilitates data exchange between memory modules located on different devices (or components) with low latency. Unifying the communication paths by using memory-semantic communication may eliminate bottlenecks and improve efficiency and performance. To provide data to the processor as quickly and as efficiently as possible, the memory bus is designed as a high-bandwidth, low-latency interface based on simple instructions. As a result, systems run well when running in memory.

Therefore, memory-semantic communication can enhance the computing capabilities of the devices by reducing overhead. Gen-Z is a memory-semantic fabric that can be used to communicate with the devices in a computing environment. By unifying the communication paths and simplifying software through simple memory-semantics, Gen-Z switches can facilitate high-performance solutions for complex systems. While memory-semantic communication can bring many desirable features to a computing environment, some issues remain unsolved regarding queue management in a switch.

One embodiment of the present invention provides a switch. During operation, the switch maintains a first counter to indicate a first number of packets in a queue of the switch. The switch then determines whether a clock of the switch has reached a threshold value. If the clock reaches the threshold value, the switch starts maintaining a second counter to indicate a second number of packets in the queue that have been received after the clock has reached the threshold value. The switch continues to decrement the first counter in response to a packet leaving the queue until the first counter reaches a value of zero. When the clock reaches a maximum deadline value associated with the clock, the switch drops a third number of packets from the queue indicated by the first counter.

In a variation on this embodiment, the switch maintaining the first counter includes the switch incrementing the first counter in response to receiving a packet in the queue prior to the clock reaching the threshold value.

In a variation on this embodiment, the switch maintaining the second counter includes the switch incrementing the second counter in response to receiving a packet in the queue after the clock has reached the threshold value and decrementing the second counter if a packet leaves the queue and the first counter has a value of zero.

In a variation on this embodiment, when the clock reaches the maximum value, the switch swaps the respective roles of the first and second counters.

In a further variation, the switch swaps the respective roles includes the switch dropping a fourth number of packets from the queue indicated by the second counter in response to the clock rolling over and reaching the maximum value for a subsequent time.

In a variation on this embodiment, the threshold value is half of the maximum value, a ceiling of the half of the maximum value, or a floor of the half of the maximum value.

In a variation on this embodiment, the switch dropping the third number of packets from the queue includes the switch removing a packet from the queue and decrementing the first counter until the first counter reaching a value of zero. The third number can indicate a positive value.

In a variation on this embodiment, the switch can support a plurality of virtual channels (VCs). The queue can correspond to a VC of the plurality of VCs. A queue of a respective VC is associated with a pair of counters.

In a variation on this embodiment, the switch is a Gen-Z component, and a respective packet is a Gen-Z transaction.

In a variation on this embodiment, the clock is one or more of a non-negative integer that is incremented at a predefined interval and a hardware clock of the computer system.

The embodiments described herein solve the problem of avoiding duplication of expired packets in network queues by (i) maintaining a counter for counting packets in the queue that arrived before a threshold time, and (ii) discarding the number of packets indicated by the counter when a clock rolls over.

In some network architectures, such Gen-Z, a switch can track the age of a packet. That packet can include a deadline or an expiration time (e.g., in the header of the packet). If the network cannot forward the packet to the destination within the deadline, the switch currently holding the packet can discard the packet. If the timer for the packet expires and the source device of the packet does not receive a response, the source device can resend the packet via the network. Unless the expired packet is discarded, the new packet can cause the network to actively hold multiple copies of the same packet. Such a situation can lead to data corruption and disrupt the state machines of the switches. Discarding expired packets is also necessary to enable proper fault isolation in the event of a failure.

With existing technologies, a switch in the network inspects the deadline of a packet when the switch processes (e.g., forwards or performs a lookup for) the packet. As a result, the packets that are not at the head of the queue are not inspected. Therefore, if the deadline of a packet in a queue expires, until the packet reaches the head of the queue, the packet remains in the switch. To avoid such a situation, a switch may examine queued packets even when the packet has not reached the head of the queue. However, this approach can be difficult since the switch needs to track each packet in the queue. In other words, without removing a packet from the queue, inspecting the header of the packet to determine whether the deadline has passed can be computationally intensive and inefficient. Furthermore, when the source device does not receive an acknowledgment within a threshold time, the source device may resend the packet. Consequently, the network can have multiple copies of the same packet.

To solve this problem, the switch can maintain a pair of counters to indicate the number of packets in the queue. To track the age of a packet, the switch can be equipped with a clock. The clock can be a counter, such as a non-negative integer, that increments at a predefined interval (e.g., once every millisecond). The clock can also be a hardware clock (e.g., the clock in a computer). This clock can be used to determine whether a packet can meet the deadline for the packet. For example, when the packet enters a queue, the switch can record the arrival time at the queue based on the current value of the clock. The packet can then move through the queue and reach the head of the queue (e.g., based on a first-in-first-out (FIFO) policy). At that time, the switch determines the departure time from the queue based on the value of the clock. By subtracting the arrival time from the departure time, the switch determines the time spent by the packet in the queue. The switch then deducts the time spent from the deadline to determine whether the packet has sufficient time left to reach the destination.

To determine whether a packet has been in a queue for a significant period, the switch can start a first (or initial) counter when the clock starts (e.g., the variable representing the clock corresponds to a value '0'). Whenever a packet enters the queue, the switch increments the first counter; and whenever a packet leaves the queue, the switch decrements the first counter. When the clock reaches a threshold value, the switch stops incrementing the first counter and starts incrementing a second counter. Since the queue can be a FIFO queue, packets at the top of the queue can be the old packets received before the clock had reached the threshold value. Hence, at this point, the first counter represents the number of packets in the queue that have been received before the clock reached the threshold value. In some embodiments, the threshold value can be half of the maximum value that can be represented by the clock (e.g., the maximum value of the variable representing the clock).

After the clock reaches the threshold value, the switch increments the second counter upon receiving a packet; and the switch decrements the first counter if a packet leaves the queue until the first counter becomes zero. When the first counter becomes zero, the switch decrements the second counter for all subsequent packet departures from the queue. However, if the clock rolls over (i.e., reaches the maximum value) and the first counter is non-zero, the switch determines that the queue includes a number of packets that are old and have been received before the clock reached the threshold value. Since these packets have the potential of missing their respective deadlines, the switch drops a number of packets corresponding to the first counter from the queue and re-initializes the first counter.

To do so, the switch removes a packet from the queue, drops the packet, and decrements the first counter. If the first counter remains non-zero, the switch repeats this process until the first counter becomes zero. In addition, at the rollover time, the switch swaps the respective roles of the first counter and the second counter (i.e., switches the first and second counters) and continues with this process. As a result, when the clock reaches the next threshold value, the second counter can represent the packets that have been received before the clock has reached the threshold value. By repeating this process, the switch can drop the old packets that may not meet their deadlines from the queue, thereby avoiding duplication of these packets in the switch.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Switch and Network Architecture

FIG. 1 illustrates an exemplary network with enhanced queue management support, in accordance with an embodiment of the present application. As illustrated in FIG. 1, a network 100 includes switches 101, 102, 103, 104, and 105. In some embodiments, network 100 is a Gen-Z network and a respective switch of network 100, such as switch 102, is a Gen-Z component. Under such a scenario, communication among the switches in network 100 is based on memory-semantic fabric. In some further embodiments, network 100 is an Ethernet and/or IP network and a respective switch of network 100, such as switch 102, is an Ethernet switch and/or IP router. Under such a scenario, communication among the switches in network 100 is based on Ethernet and/or IP.

Suppose that a device 112 sends a packet 134 (e.g., a Gen-Z transaction) to a device 114. In network 100, a respective switch can track the age of a packet 134. Packet 134 can include a deadline (e.g., in the header of packet 134). When packet 134 reaches switch 102, switch 102 inserts packet 134 in a FIFO queue 130. Device 112 can maintain a timer for packet 134 to determine whether a response has been received. If the timer for packet 134 expires and device 112 does not receive a response, device 112 can resend packet 134 via network 100. Unless the expired version of packet 134 is discarded, the new version of packet 134 can cause network 100 to actively hold multiple copies of the same packet 134. Such a situation can lead to data corruption and disrupt the state machines of the interfaces of the switches. Discarding expired packets is also necessary to enable proper fault isolation in the event of a failure.

With existing technologies, switch 102 inspects the deadline of packet 134 when switch 102 processes packet 134. In this example, packet 134, as well as packets 136 and 138, are behind packet 132 in queue 130. Here, one or more packets behind packet 132 can be older than packet 132. Since packets 134, 136, and 138 are not inspected by switch 102 for their deadlines, if the deadline of packet 134 has expired in queue 130, packet 134 remains in switch 102 until packet 134 reaches the head of queue 130. To avoid such a situation, switch 102 may examine packet 134 even when packet 134 has not reached the head of queue 130. However, this approach can be difficult since switch 102 needs to track each packet of packets 134, 136, and 138 in queue 130. In other words, without removing packet 130 from queue 130, inspecting the header of packet 134 to determine whether the deadline has passed can be computationally intensive and inefficient. Furthermore, when device 112 does not receive an acknowledgment within a threshold time, device 112 may resend packet 134. Consequently, network 100 can have multiple copies of the same packet 134.

To solve this problem, switch 102 can maintain a pair of counters 142 and 144 to indicate the number of packets in queue 130. To track the age of a packet, switch 130 can be equipped with clock 140. Clock 140 can be a counter, such as one that tracks a non-negative integer, that increments at a predefined interval. Clock 140 can also be a hardware clock of switch 102. Clock 140 can be used to determine whether a packet can meet the deadline for the packet. For example, when packet 134 enters queue 130, switch 102 can record the arrival time at queue 130 based on the current value of clock 140. Packet 134 can then move through queue 130 and reach the head of queue 130. At that time, switch 102 determines the departure time from queue 130 based on the value of clock 140. By subtracting the arrival time from the departure time, switch 102 determines the time spent by packet 134 in queue 130. Switch 102 then deducts the time spent from the deadline to determine whether packet 134 has sufficient time left to reach device 114.

To determine whether packet 134 has been in queue 130 for a significant period, switch 102 can start counter 142 when clock 140 starts with a value of '0.' Whenever a packet enters queue 130, switch 102 increments counter 142; and whenever a packet leaves queue 130, switch 102 decrements counter 142. When clock 140 reaches a threshold value 154, switch 102 stops incrementing counter 142 and starts incrementing counter 144. For example, if packet 138 arrives after clock 140 has reached threshold value 154, counter 144 is incremented instead of counter 142.

Since queue 130 can be a FIFO queue, packets at the top of the queue (denoted with a dotted line) can be packets 132, 134, and 136 received before clock 140 had reached threshold value 154. Hence, at this point, counter 142 represents the number of packets (e.g., a value of 3) in the queue that have been received before clock 140 reached threshold value 154. In some embodiments, threshold value 154 can be the half of a maximum value 152 that can be represented by clock 140. If the variable representing clock 140 has n bits, maximum value 152 can be the maximum value that can be represented by n bits. In some embodiments, threshold value 154 can be represented by the maximum value that can be represented by the least significant m bits of clock 140 (e.g., m can be n/2). As a result, when (m+1)th least significant bit is set, switch 102 determines that threshold value 154 has been reached.

Even though switch 102 starts incrementing counter 144 upon receiving subsequent packets, such as packet 138, switch 102 continues to decrement counter 142 if a packet, such as packet 132, leaves queue 130 until counter 142 becomes zero. However, if clock 140 rolls over (i.e., reaches maximum value 152) and counter 142 remains non-zero, switch 102 determines that queue 130 includes packets that are old and have been received before clock 130 reached threshold value 154. Since these packets have the potential of missing their respective deadlines, switch 102 drops the packets from the head of queue 130 (i.e., packets 134 and 136) based on the value of counter 142 and re-initializes counter 142.

Furthermore, at the rollover time, switch 102 swaps the respective roles of counters 142 and 144 and continues with this process. In other words, when clock 140 reaches threshold value 154 in the next iteration, switch 102 repeats the process of dropping old packets based on counter 144. By repeating this process, switch 102 can drop the old packets that may not meet their deadlines from queue 130. In this way, switch 102 can facilitate enhanced queue management and avoid duplication of packets in switch 102.

Figure 2:
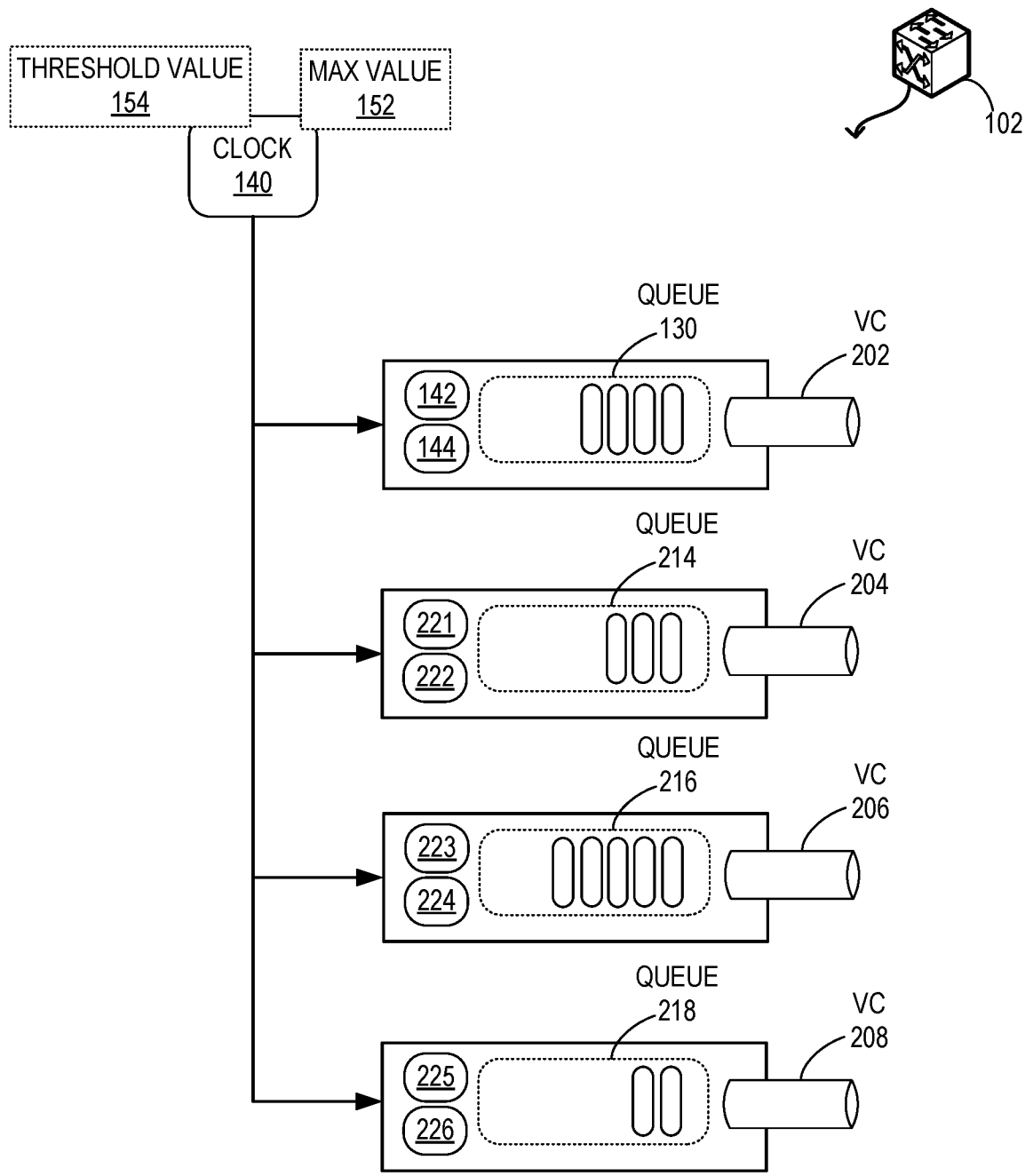
FIG. 2 illustrates exemplary enhanced queue management for individual virtual channels (VCs), in accordance with an embodiment of the present application.

In some embodiments, switch 102 can maintain separate queues for each virtual channel (VC). To facilitate enhanced queue management, switch 102 can maintain a counter pair for each VC. FIG. 2 illustrates exemplary enhanced queue management for individual virtual channels (VCs), in accordance with an embodiment of the present application. Switch 102 can support a number of VCs 202, 204, 206, and 208. A respective VC can logically represent a set of interfaces or ports, a direction of transmission and receive queues/buffers, and corresponding tracking logic and resources. Each VC can be identified by a unique identifier in switch 102 and correspond to a unique flow control domain. Multiple VCs can transmit packets via the same link based on a sharing policy (e.g., link-time multiplexing). In some embodiments, to avoid deadlocks, switch 102 can send request packets via one VC and receive response packets via another VC.

In this example, queue 130 and its counters 142 and 144 can be associated with VC 202. If switch 102 receives a packet for VC 202, switch 102 can store that packet in queue 130. Switch 102 can then perform enhanced queue management on queue 130 based on counters 142 and 144. Similarly, VCs 204, 206, and 208 can have their dedicated queues 214, 216, and 218, respectively. Switch 102 can facilitate enhanced queue management using counters 221 and 222 for queue 214, counters 223 and 224 for queue 216, and counters 225 and 226 for queue 218. Since each VC may have different packet arrivals and departures, by maintaining individual queues and their corresponding counters, switch 102 can remove stale or old packets from a queue based on the packets in that queue.

In some embodiments, switch 102 can maintain the same clock 140 for queues 130, 214, 216, and 218. Since the switchover between counters is determined based on the value indicated by clock 140, each queue does not need to maintain an individual clock. As a result, when clock 140 reaches threshold value 154, switch 102 can execute the switchover between counters for each VC. Similarly, when clock 140 rolls over, switch 102 can execute the switchover between counters and swap the roles of counters for each VC. As a result, when switch 102 starts incrementing counter 144 instead of counter 142, switch 102 also starts incrementing counter 222 instead of counter 221. However, if an individual queue needs to maintain its dedicated threshold value, switch 102 can use a dedicated clock for that queue. Consequently, switch 102 can execute the switchover between counters using that dedicated clock.

Packet Tracking

Figure 3A:
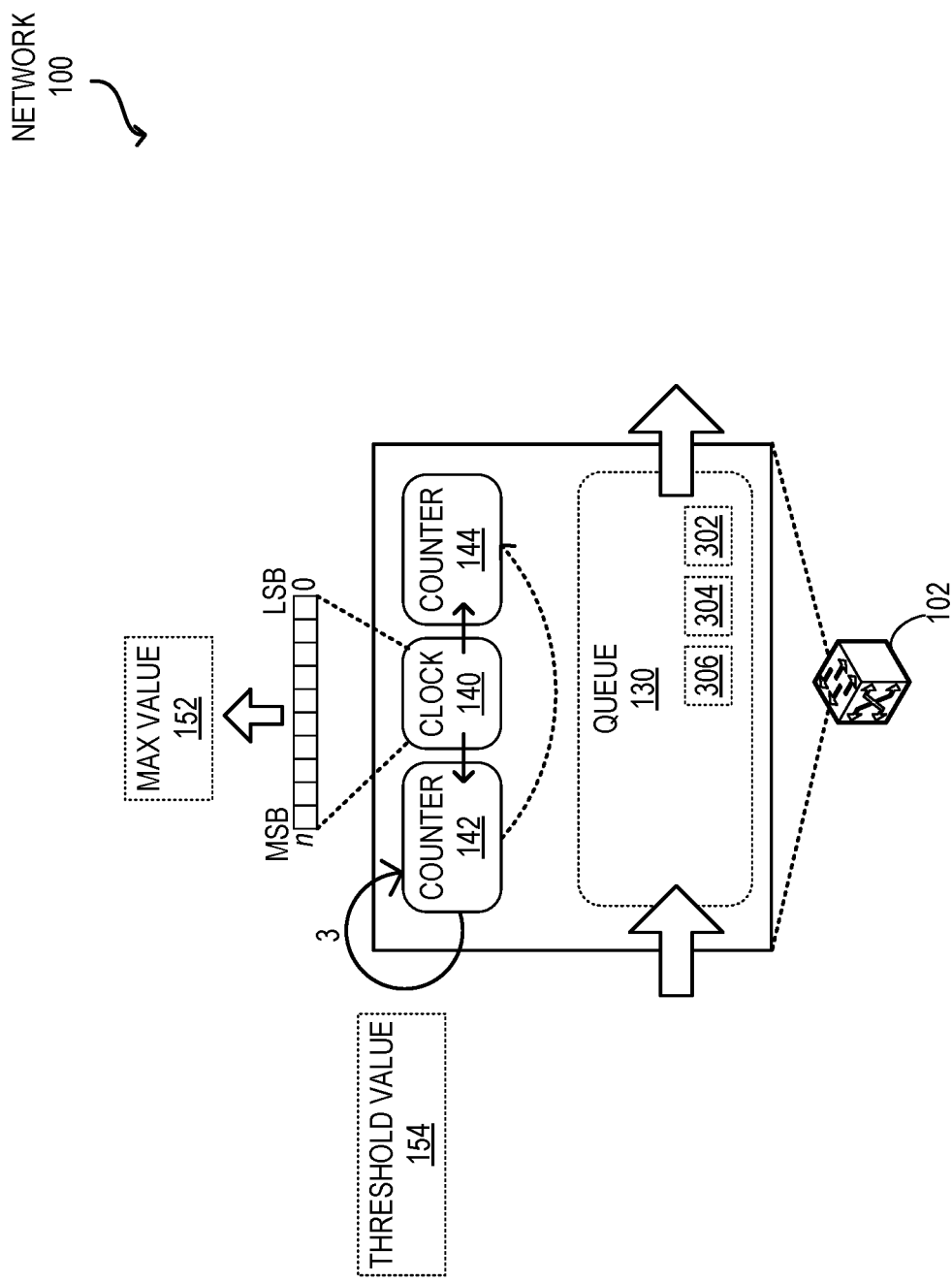
FIG. 3A illustrates exemplary operations of enhanced queue management using an initial counter, in accordance with an embodiment of the present application.

FIG. 3A illustrates exemplary operations of enhanced queue management using an initial counter, in accordance with an embodiment of the present application. During operation, switch 102 receives a number of packets 302, 304, and 306. Switch 102 can store these packets in queue 130 in the order of their arrival. Whenever a packet enters queue 130, switch 102 increments counter 142; and whenever a packet leaves queue 130, switch 102 decrements counter 142. In this example, since packets 302, 304, and 306 have entered queue 130, the value of counter 142 can be 3.

When clock 140 reaches a threshold value 154, switch 102 stops incrementing counter 142 and starts incrementing counter 144 (denoted by a dashed arrow). Since queue 130 can be a FIFO queue, packets at the top of the queue can be packets 302, 304, and 306 received before clock 140 had reached threshold value 154. Hence, at this point, counter 142 represents the number of packets (e.g., a value of 3) in the queue that have been received before clock 140 reached threshold value 154.

FIG. 3B illustrates exemplary operations of enhanced queue management using a secondary counter, in accordance with an embodiment of the present application. When clock 140 reaches threshold value 154, switch 102 stops incrementing counter 142 and starts incrementing counter 144. For example, if packet 312 arrives after clock 140 has reached threshold value 154 (denoted with a dotted line), counter 144 is incremented to a value of 1. Similarly, switch 102 increments counter 144 when subsequent packets 314, 316, and 318 arrive in queue 130. Accordingly, switch 102 increments counter 144 to 4.

Even though switch 102 starts incrementing counter 144 upon receiving subsequent packets, switch 102 continues to decrement counter 142 if a packet leaves queue 130 until counter 142 becomes zero. For example, when packet 302 leaves queue 130, switch 102 sets the value of counter 142 to 2 by decrementing counter 142 by 1. Similarly, when packet 304 leaves queue 130, switch 102 sets the value of counter 142 to 1 by decrementing counter 142 by 1. Here, the value of 1 corresponds to packet 306.

It should be noted that a packet may leave queue 130 while other packets arrive in queue 130. For example, packet 302 may leave queue 130 while packet 314 arrives in queue 130. Switch 102 can continue decrementing counter 142 until it becomes zero. For all subsequent packet departures, switch 102 can start decrementing counter 144. However, if clock 140 rolls over (i.e., reaches maximum value 152) and counter 142 remains non-zero, switch 102 determines that queue 130 includes packets that are old and have been received before clock 130 reached threshold value 154.

Since these packets have the potential of missing their respective deadlines, switch 102 drops 1 packet from the head of queue 130 (i.e., packet 306) based on the value of counter 142 and re-initializes counter 142. To do so, switch 102 removes packet 306 from queue 130, drops packet 306 (denoted with an arrow), and decrements counter 142. If counter 142 remains non-zero, switch 102 repeats this process until counter 142 becomes zero. In this example, dropping packet 306 from queue 130 causes counter 142 to have a value of '0.' Consequently, switch 102 halts the packet dropping process.

FIG. 3C illustrates exemplary operations of enhanced queue management using counter switchover, in accordance with an embodiment of the present application. Suppose that switch 102 dequeues packets 312 and 314 from queue 130 and forward the packets. At the rollover time, switch 102 swaps the respective roles of counters 142 and 144 and continues with this process. In other words, when clock 140 reaches threshold value 154 in the next iteration, switch 102 identifies old packets based on counter 144. As a result, when clock 140 reaches threshold value 154, counter 144 can represent packets 316 and 318 that have been received before clock 140 has reached threshold value 154 in the next iteration.

The count of the subsequent packets, such as packets 322 and 324, are indicated by counter 142. When clock 140 rolls over in this next iteration, switch 102 determines which packets to drop based on counter 144 and swaps the respective roles of counters 144 and 142. By repeating this process, switch 102 can drop the old packets that may not meet their deadlines from queue 130, thereby avoiding duplication of these packets in switch 102.

Operations

Figure 4:
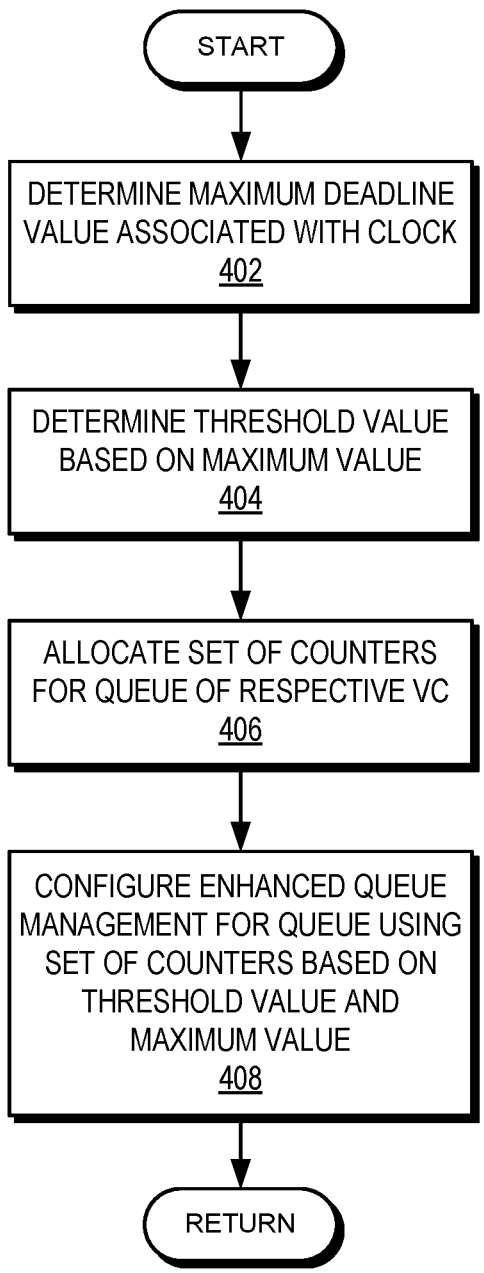
FIG. 4 presents a flowchart illustrating the process of a switch initializing enhanced queue management, in accordance with an embodiment of the present application.

FIG. 4 presents a flowchart illustrating the process of a switch initializing enhanced queue management, in accordance with an embodiment of the present application. During operation, the switch determines a maximum deadline value associated with a clock of the switch (e.g., a maximum value supported by the clock) (operation 402). The switch then determines a threshold value based on the maximum value (operation 404). In some embodiments, the threshold value is half (or a ceiling or floor) of the maximum value. Subsequently, the switch allocates a set of counters (e.g., a counter pair) corresponding for a queue of a respective VC (operation 406). The switch then configures enhanced queue management for the queue using the set of counters based on the threshold value and the maximum value (operation 408).

Figure 5A:
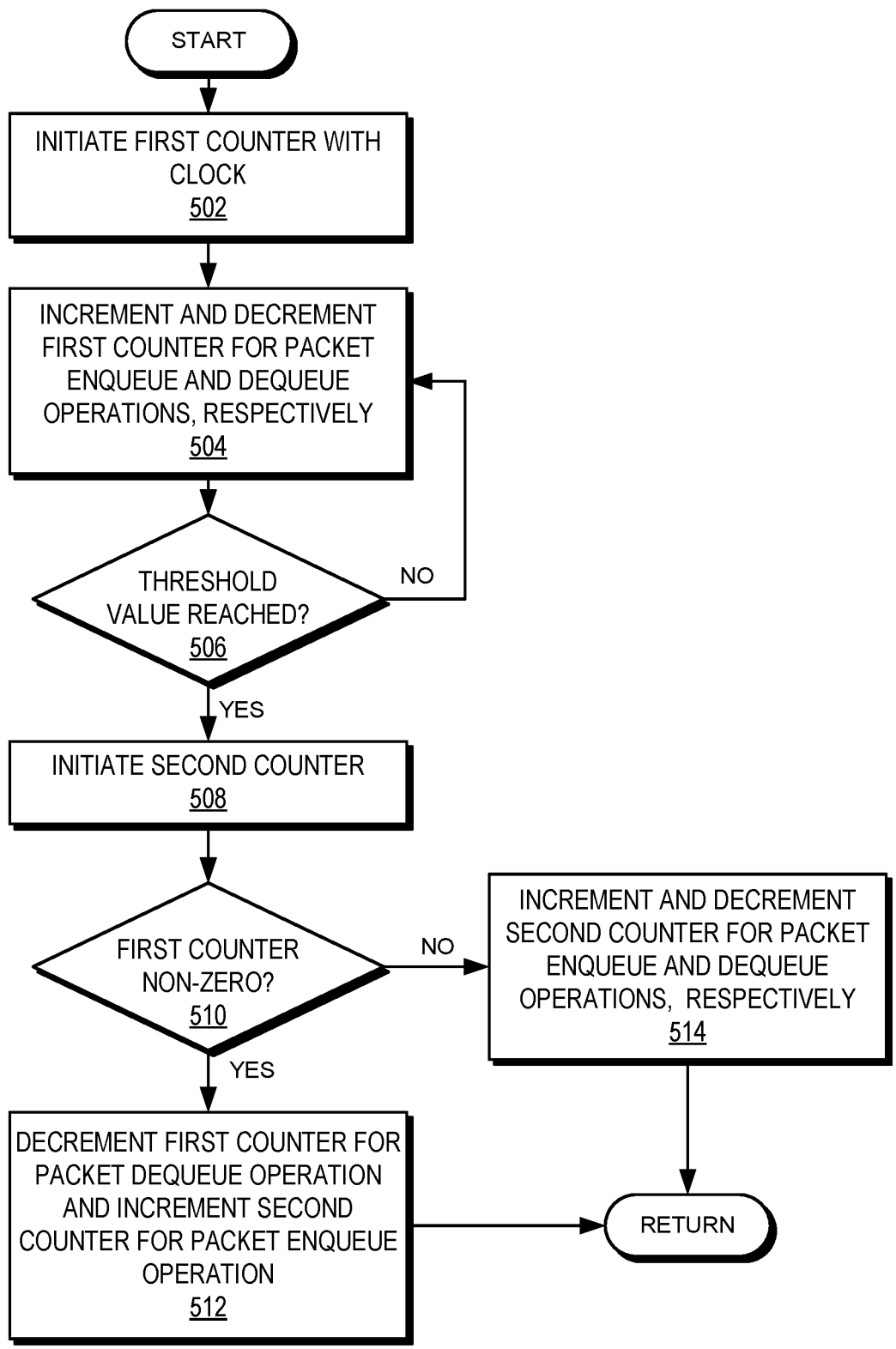
FIG. 5A presents a flowchart illustrating the process of a switch facilitating a first phase of enhanced queue management, in accordance with an embodiment of the present application.

FIG. 5A presents a flowchart illustrating the process of a switch facilitating a first phase of enhanced queue management, in accordance with an embodiment of the present application. During operation, the switch initiates a first counter (operation 502). The switch then increments and decrements the first counter for packet enqueue and dequeue operations, respectively (operation 504). The switch checks whether the first counter has reached a threshold value (operation 506). If the counter has not reached the threshold value, the switch continues to increment and decrement the first counter for packet enqueue and dequeue operations, respectively (operation 504).

On the other hand, if the counter has reached the threshold value, the switch initiates a second counter (operation 508). The switch then checks whether the first counter has a non-zero value (operation 510). If the counter has a non-zero value, the switch decrements the first counter for packet dequeue operation and increments the second counter for packet enqueue operation (operation 512). On the other hand, if the counter has a non-zero value, the switch increments and decrements the second counter for packet enqueue and dequeue operations, respectively (operation 514).

Figure 5B:
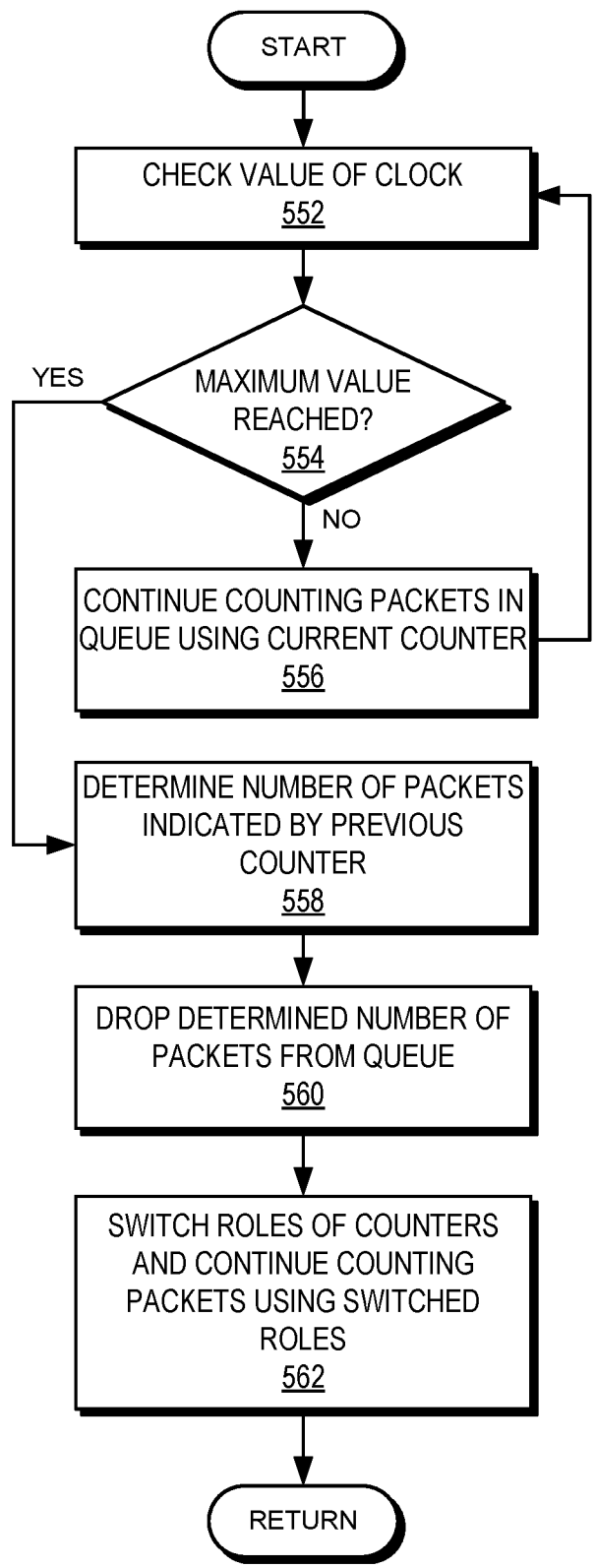
FIG. 5B presents a flowchart illustrating the process of a switch facilitating a second phase of enhanced queue management, in accordance with an embodiment of the present application.

FIG. 5B presents a flowchart illustrating the process of a switch facilitating a second phase of enhanced queue management, in accordance with an embodiment of the present application. During operation, the switch checks the value of the clock (operation 552) and determines whether the clock has reached a maximum value (operation 554). If the clock has not reached the maximum value, the switch continues counting packets in the queue using the current counter (e.g., counter 144 in FIG. 3B) (operation 556). If the clock has reached the maximum value, the switch determines the number of packets indicated by the previous counter (e.g., counter 142 in FIG. 3B) (operation 558). The switch then drops the determined number of packets from the queue (operation 560) and switches roles of the counters and continues counting packets using the switched roles (operation 562).

Exemplary Switch

Figure 6:
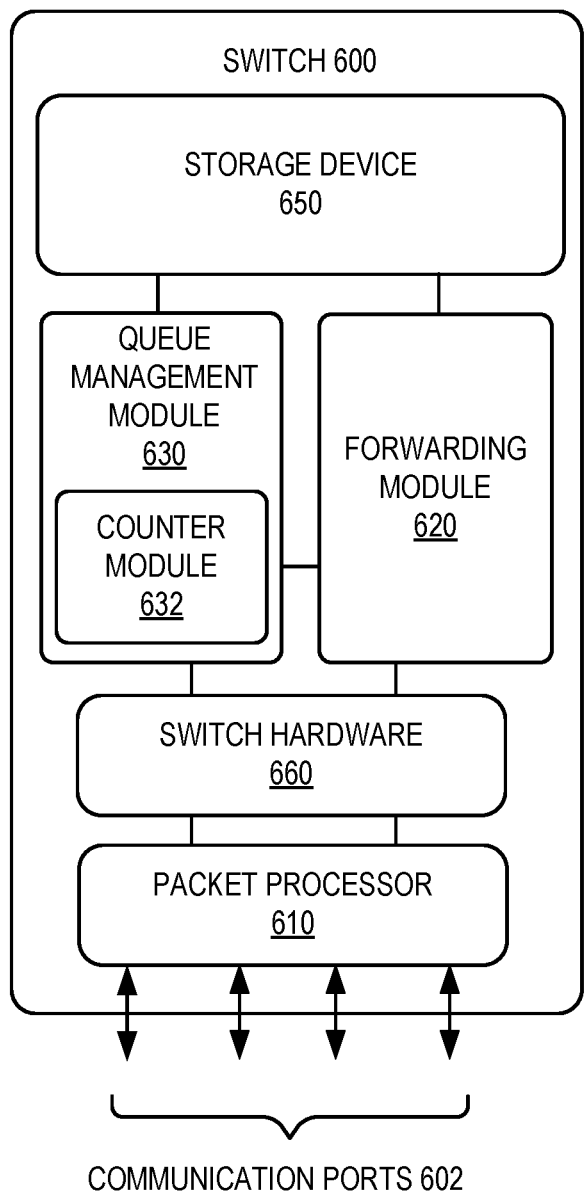
FIG. 6 illustrates an exemplary switch with enhanced queue management support, in accordance with an embodiment of the present application.

FIG. 6 illustrates an exemplary switch with enhanced queue management support, in accordance with an embodiment of the present application. In this example, a switch 600 includes a number of communication ports 602, a packet processor 610, a queue management module 630, forwarding module 620, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 extracts and processes header information from the received frames. Packet processor 610 can identify a switch identifier (e.g., a MAC address and/or an IP address) associated with the switch in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Communication ports 602 can include one or more ports capable of receiving transactions encapsulated in a Gen-Z header. Packet processor 610 can process Ethernet frames, IP packets, and/or Gen-Z transactions.

During operation, queue management module 630 can facilitate enhanced queue management for a buffer or a queue for a respective VC. The queue can be an input/receiving queue and/or an output/transmission queue. A counter module 632 of queue management module 630 can maintain a set of counters that facilitates the enhanced queue management based on a maximum value and a threshold value of the clock of the switch. Forwarding module 620 can forward packets from the queue.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising: maintaining a first counter to indicate a first number of packets in a queue of a switch; determining whether a time value of a clock of the switch has reached a threshold value, wherein the threshold value is half of the maximum deadline value, a ceiling of the half of the maximum deadline value, or a floor of the half of the maximum deadline value;

in response to the time value of the clock reaching the threshold value:

maintaining a second counter to indicate a second number of packets in the queue that have been received after the time value of the clock has reached the threshold value; and decrementing the first counter in response to a packet leaving the queue until the first counter reaches a value of zero and incrementing the second counter in response to a packet arriving at the queue; and in response to the time value of the clock reaching a maximum deadline value associated with the clock, dropping, from the queue, a third number of packets indicated by the first counter.

2. The method of claim 1, wherein maintaining the first counter further comprises incrementing the first counter in response to receiving a packet in the queue prior to the time value of the clock reaching the threshold value.

3. The method of claim 1, wherein maintaining the second counter further comprises:

decrementing the second counter in response to a packet leaving the queue and the first counter having a value of zero.

4. The method of claim 1, further comprising, in response to the time value of the clock reaching the maximum deadline value, switching the respective roles of the first and second counters.

5. The method of claim 4, wherein switching the respective roles comprises dropping, from the queue, a fourth number of packets indicated by the second counter in response to the clock rolling over and reaching the maximum deadline value for a subsequent time.

6. The method of claim 1, wherein dropping the third number of packets from the queue comprises removing a packet from the queue and decrementing the first counter until the first counter reaching a value of zero, wherein the third number indicates a positive value prior to the decrement.

7. The method of claim 1, wherein the switch supports a plurality of virtual channels (VCs), wherein the queue corresponds to a VC of the plurality of VCs, and wherein a queue of a respective VC is associated with a pair of counters.

8. The method of claim 1, wherein the switch is a Gen-Z component of a Gen-Z network architecture and a respective packet is a Gen-Z transaction.

9. The method of claim 1, wherein the clock is one or more of:
  a non-negative integer that is incremented at a predefined interval; and
  a hardware clock of the switch.

10. A computer system, comprising:
  a processor; and
  a non-transitory computer-readable storage medium storing instructions, which when executed by the processor causes the processor to perform a method, the method comprising:
   maintaining a first counter to indicate a first number of packets in a queue of the computer system;
   determining whether a time value of a clock of the computer system has reached a threshold value, wherein the threshold value is half of the maximum deadline value, a ceiling of the half of the maximum deadline value, or a floor of the half of the maximum deadline value;
   in response to the time value of the clock reaching the threshold value:
    maintaining a second counter to indicate a second number of packets in the queue that have been received after the time value of the clock has reached the threshold value; and
    decrementing the first counter in response to a packet leaving the queue until the first counter reaches a value of zero and incrementing the second counter in response to a packet arriving at the queue; and
   in response to the time value of the clock reaching a maximum deadline value associated with the clock, dropping, from the queue, a third number of packets indicated by the first counter.

11. The computer system of claim 10, wherein maintaining the first counter further comprises incrementing the first counter in response to receiving a packet in the queue prior to the time value of the clock reaching the threshold value.

12. The computer system of claim 10, wherein maintaining the second counter further comprises:
  decrementing the second counter in response to a packet leaving the queue and the first counter having a value of zero.

13. The computer system of claim 10, wherein the method further comprises, in response to the time value of the clock reaching the maximum deadline value, switching the respective roles of the first and second counters.

14. The computer system of claim 13, wherein switching the respective roles comprises dropping, from the queue, a fourth number of packets indicated by the second counter in response to the clock rolling over and reaching the maximum deadline value for a subsequent time.

15. The computer system of claim 10, wherein dropping the third number of packets from the queue comprises removing a packet from the queue and decrementing the first counter until the first counter reaching a value of zero, wherein the third number indicates a positive value prior to the decrement.

16. The computer system of claim 10, wherein the computer system supports a plurality of virtual channels (VCs), wherein the queue corresponds to a VC of the plurality of VCs, and wherein a queue of a respective VC is associated with a pair of counters.

17. The computer system of claim 10, wherein the computer system is a Gen-Z component of a Gen-Z network architecture and a respective packet is a Gen-Z transaction.

18. The computer system of claim 10, wherein the clock is one or more of:
  a non-negative integer that is incremented at a predefined interval; and
  a hardware clock of the computer system.

* * * * *